(12) United States Patent
Cho et al.

(10) Patent No.: US 11,788,418 B2
(45) Date of Patent: Oct. 17, 2023

(54) GAS TURBINE VANE AND ASSEMBLY IN LATTICE-STRUCTURE COOLING TYPE

(71) Applicant: Industry-Academic Cooperation Foundation, Yonsei University, Seoul (KR)

(72) Inventors: Hyung Hee Cho, Seoul (KR); Ho Seop Song, Seoul (KR); Minho Bang, Gimpo-si (KR); Heeseung Park, Seoul (KR); Taehyun Kim, Suwon-si (KR); Seungyeong Choi, Seoul (KR); Jeong Ju Kim, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 17/742,935

(22) Filed: May 12, 2022

(65) Prior Publication Data

US 2023/0016532 A1 Jan. 19, 2023

(30) Foreign Application Priority Data

May 13, 2021 (KR) ........................ 10-2021-0061763

(51) Int. Cl.
*F01D 5/18* (2006.01)
*B33Y 10/00* (2015.01)
*B33Y 80/00* (2015.01)

(52) U.S. Cl.
CPC .............. *F01D 5/187* (2013.01); *B33Y 10/00* (2014.12); *B33Y 80/00* (2014.12); *F05D 2230/30* (2013.01); *F05D 2260/201* (2013.01)

(58) Field of Classification Search
CPC ....... F01D 4/187; F01D 2230/30; F01D 5/187
See application file for complete search history.

(56) References Cited

U.S. PATENT DOCUMENTS

2003/0228223 A1* 12/2003 Bunker ................... F01D 5/225
416/97 R
2016/0003549 A1* 1/2016 Fujimoto ................. F02C 7/18
165/164

(Continued)

FOREIGN PATENT DOCUMENTS

CN 109751090 A 5/2019
KR 20030076848 A 9/2003

(Continued)

OTHER PUBLICATIONS

Song et al., "Heat Transfer Characteristics of Impingement/Effusion Cooling with Additive Manufactured Structure", Korean Society of Fluid Machinery 2019 Winter Conference, 2019, pp. 272-274.

*Primary Examiner* — Long T Tran
(74) *Attorney, Agent, or Firm* — The Webb Law Firm

(57) ABSTRACT

Provided is a gas turbine vane and blade assembly in which lattice structures are installed between an impingement plate and an effusion plate. The gas turbine vane and blade assembly is capable of enhancing cooling efficiency in an impingement/effusion cooling technique.
In addition, the gas turbine vane and blade assembly can be manufactured using an additive manufacturing technique, and the lattice structures are capable of replacing supports that are used during an additive manufacturing process, and improving not only structural rigidity and stability but also cooling performance.

6 Claims, 8 Drawing Sheets

(56) References Cited

U.S. PATENT DOCUMENTS

| | | | |
|---|---|---|---|
| 2016/0151829 A1* | 6/2016 | Propheter-Hinckley | ..................... B28B 1/001 164/529 |
| 2016/0169003 A1* | 6/2016 | Wong | ...................... F01D 5/187 415/115 |
| 2018/0163545 A1 | 6/2018 | Bang | |
| 2020/0191000 A1* | 6/2020 | Pang | ....................... F01D 5/189 |
| 2021/0222560 A1* | 7/2021 | Snider | ..................... F01D 5/186 |
| 2021/0222565 A1* | 7/2021 | Snider | ....................... F01D 5/18 |
| 2021/0222566 A1* | 7/2021 | Snider | ..................... F01D 11/02 |
| 2021/0222568 A1* | 7/2021 | Snider | ..................... F01D 25/12 |
| 2021/0396179 A1* | 12/2021 | Balandier | ............... F01D 5/022 |

FOREIGN PATENT DOCUMENTS

| | | |
|---|---|---|
| KR | 100527686 B1 | 11/2005 |
| KR | 1020180065728 A | 6/2018 |
| KR | 1020180137217 A | 12/2018 |

\* cited by examiner

FIG. 6A
FIG. 6B
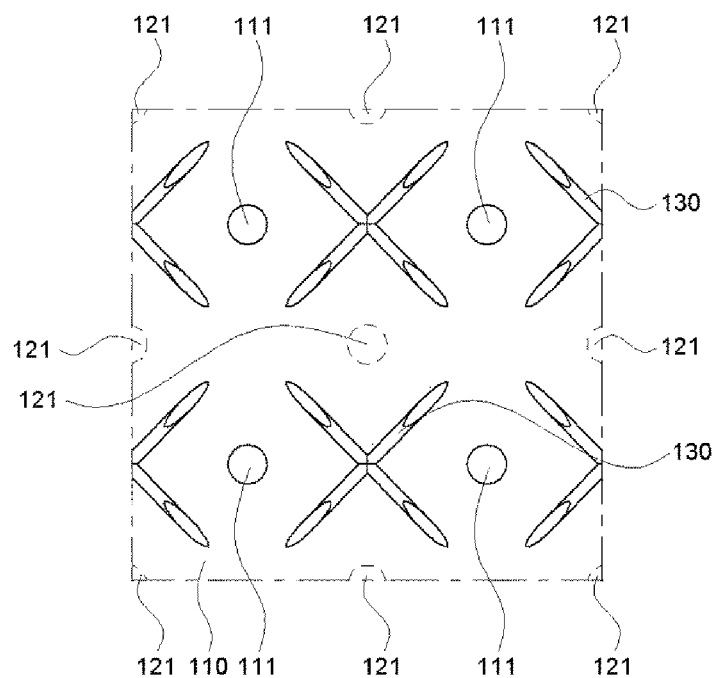
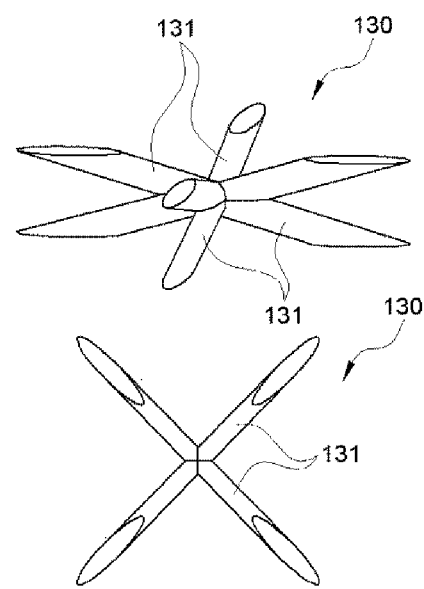

GAS TURBINE VANE AND ASSEMBLY IN LATTICE-STRUCTURE COOLING TYPE

CROSS-REFERENCE TO RELATED APPLICATION

This application claims priority to Korean Patent Application No. 10-2021-0061763 filed May 13, 2021, the disclosure of which is hereby incorporated by reference in its entirety.

BACKGROUND OF THE INVENTION

Field of the Invention

The following disclosure relates to a gas turbine vane and blade assembly.

Description of Related Art

A gas turbine, which is a device mainly used for a power generation system in power generation and transportation fields, includes a combustor and a turbine as basic components. Specifically, the gas turbine compresses air with a compressor, supplies the compressed air to a combustion chamber, and injects fuel into the combustion chamber for combustion. At this time, high-temperature and high-pressure gas is generated and blown into the turbine. The high-temperature and high-pressure gas expands, thereby rotating the turbine.

In the gas turbine, a heat load is applied to vanes and blades. Recently, there is a growing trend towards a rise in turbine inlet temperature in order to improve the performance and efficiency of the gas turbine. However, it is necessary to efficiently cool the gas turbine in order to improve efficiency in operating the gas turbine.

For this reason, the design for cooling parts exposed to a high temperature of the gas turbine becomes important, and accordingly, various cooling techniques are used for making designs.

According to the conventional art, the vanes and blades of the gas turbine are cooled using an impingement/effusion cooling technique having high cooling efficiency by combining the advantages of internal cooling and external cooling.

In the conventional impingement/effusion cooling technique, cooling air introduced through holes of a plate impinges with an impingement plate, thereby obtaining a impingement cooling effect, and then is effused through holes of the effusion plate, thereby obtaining a film cooling effect.

However, the conventional impingement/effusion cooling technique has a problem in that heat transfer decreases, due to interference between adjacent impingement jets, locally in an area where the interference occurs.

In addition, in order to prevent the decrease in heat transfer inside the gas turbine, pin-fins may be inserted into the gas turbine. However, in an additive manufacturing process for forming the pin-fins, it is necessary to manufacture and remove supports. Thus, the insertion of the pin-fins is inefficient.

Therefore, there is a need to develop a technique capable of solving these problems.

RELATED ART DOCUMENT

Patent Document

Korean Patent Laid-Open Publication No. 10-2018-0137217 (Dec. 27, 2018)

SUMMARY OF THE INVENTION

An embodiment of the present invention is directed to providing a gas turbine vane and blade assembly with improved structural stability while having high cooling performance.

In one general aspect, a gas turbine vane and blade assembly in a lattice-structure cooling type, which is a vane and blade assembly applied to a gas turbine, includes a impingement plate disposed on an inner side and having a plurality of effusion holes, and a effusion plate disposed on an outer side and having a plurality of effusion holes, the impingement plate and the effusion plate forming a double partition wall having a cavity therein, wherein a plurality of lattice structures are formed in the cavity to have a flow structure while supporting the impingement plate and the effusion plate.

The injection holes of the impingement plate and the effusion holes of the effusion plate may be arranged in a staggered manner not to face each other.

The lattice structures may be formed between the injection holes and the effusion holes adjacent to each other.

The lattice structures may replace supports that are taken into consideration for an additive manufacturing process.

Each of the lattice structures may be formed in a triangular pyramid structure.

Each of the lattice structures may be formed in a quadrangular pyramid structure.

In another general aspect, a method of manufacturing the gas turbine vane and blade assembly in the lattice-structure cooling type includes: selecting a shape of the lattice structures; and performing an additive manufacturing process using a metal 3D printer to manufacture the gas turbine vane and blade assembly in a double partition wall structure with the lattice structures inside.

In the performing of the additive manufacturing process, a build orientation in which the lattice structures are stacked is selectable.

The gas turbine vane and blade assembly in the lattice-structure cooling type according to the present invention has the following effects.

By installing the lattice structures between the impingement plate and the effusion plate, it is possible for cooling air to be effused through the effusion plate after impinges with the impingement plate, thereby enhancing cooling efficiency.

In addition, the vane and blade assembly can be manufactured using an additive manufacturing technique. The lattice structures are capable of replacing supports that are used when the vane and blade assembly is manufactured in an additive manufacturing process. The lattice structures are capable of not only enhancing structural rigidity and stability but also improving cooling performance.

BRIEF DESCRIPTION OF THE DRAWINGS

FIGS. 6A and 6B are views showing lattice structures in the gas turbine vane and blade assembly in the lattice-structure cooling type according to another embodiment of the present invention.

DETAILED DESCRIPTION OF MAIN ELEMENTS

Figure 1:
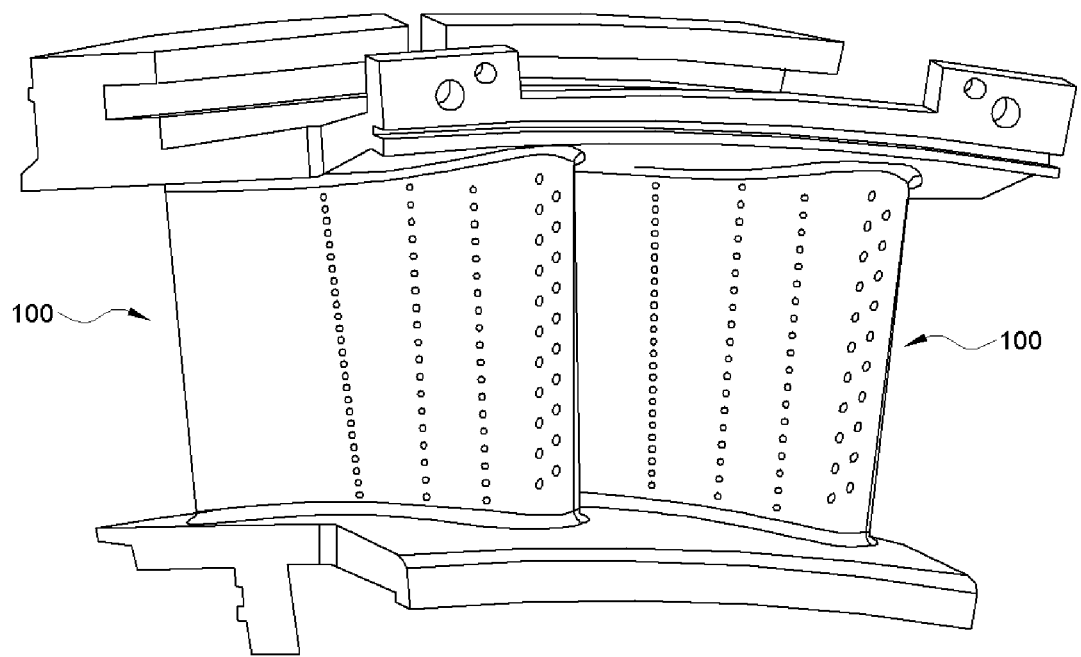
FIG. 1 is a view showing a gas turbine vane and blade assembly using a lattice-structure cooling technique according to embodiments of the present invention.

100: Vane and blade assembly
110: Impingement plate
111: Injection hole
120: Effusion plate
121: Effusion hole
130: Lattice structure
131: Support
140: Cavity

DESCRIPTION OF THE INVENTION

In order for those skilled in the art to sufficiently understand the present invention, preferred embodiments of the present invention will be described with reference to the accompanying drawings. The embodiments of the present invention may be modified in various forms, and the scope of the present invention should not be construed as being limited to the embodiments to be described in detail below.

Hereinafter, an apparatus for measuring an insulation resistance according to the present invention will be described in detail with reference to the accompanying drawings. The accompanying drawings are provided merely for illustrative purposes so as to sufficiently transfer the spirit of the present invention to those skilled in the art, and the present invention is not limited to the accompanying drawings set forth below, but may be implemented in other forms. The embodiments are provided to more completely explain the present invention to those having ordinary knowledge in the art. For this reason, throughout the drawings, the shapes and the like of elements may be exaggerated for the purpose of clarity. It should be noted that, in the drawings, the same elements are denoted by the same reference numerals. In addition, detailed descriptions of known features and configurations that are likely to unnecessarily obscure the gist of the present invention will be omitted.

Hereinafter, the embodiments of the present invention will be described with reference to the accompanying drawings.

Figure 2:
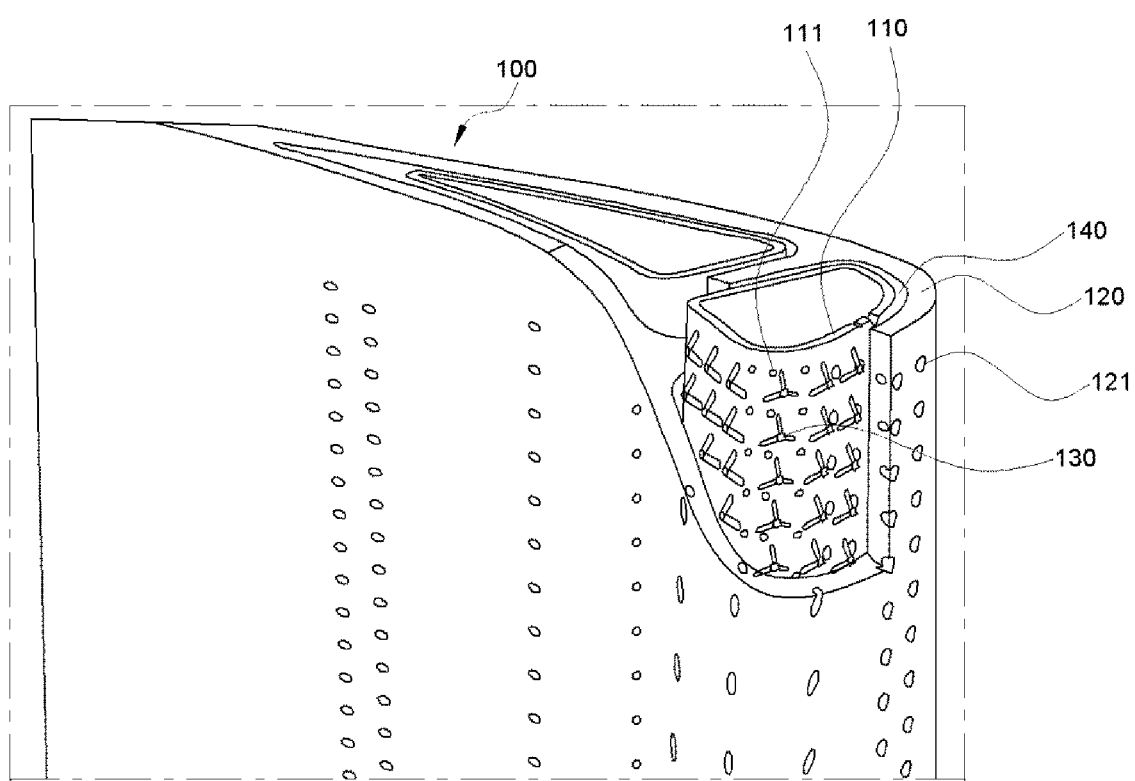
FIG. 2 is a view showing a part of the inside of a gas turbine vane and blade assembly in a lattice-structure cooling type according to an embodiment of the present invention.
Figure 3A:
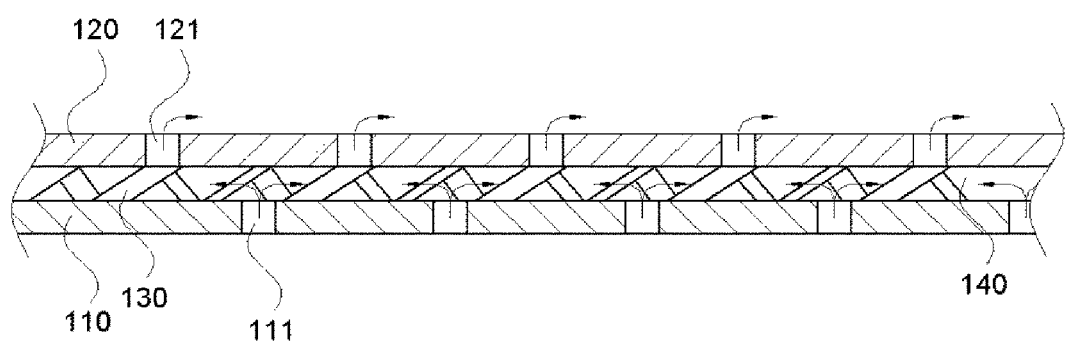
FIGS. 3A and 3B are cross-sectional views showing flows of cooling air in the respective gas turbine vane and blade assemblies in the lattice-structure cooling type according to embodiments of the present invention.
Figure 3B:
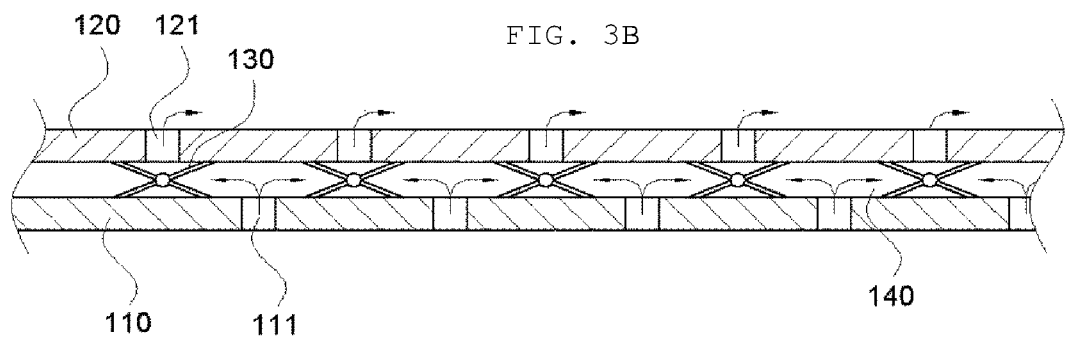
Figure 4A:
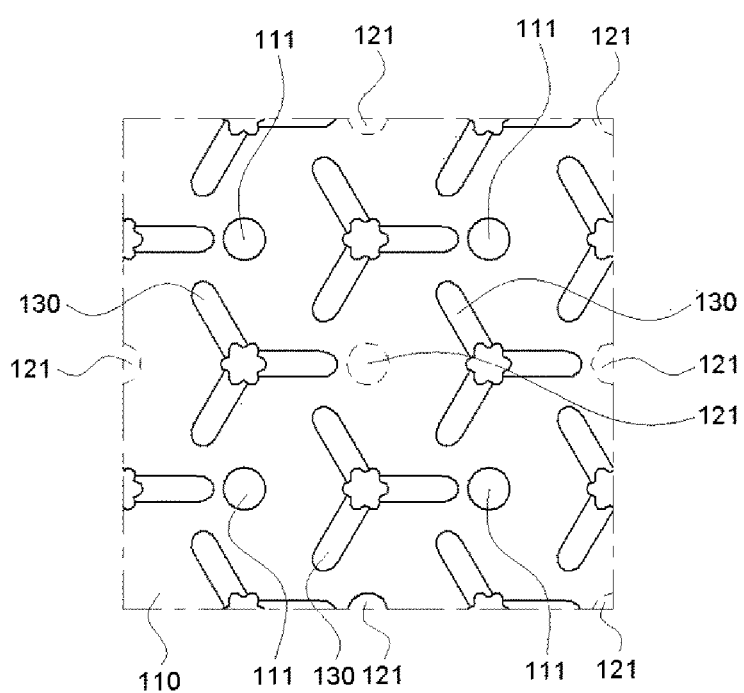
FIGS. 4A and 4B are views showing lattice structures in the gas turbine vane and blade assembly in the lattice-structure cooling type according to an embodiment of the present invention.
Figure 4B:
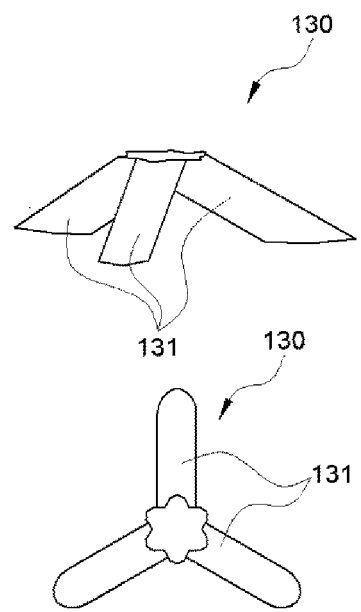
Figure 5:
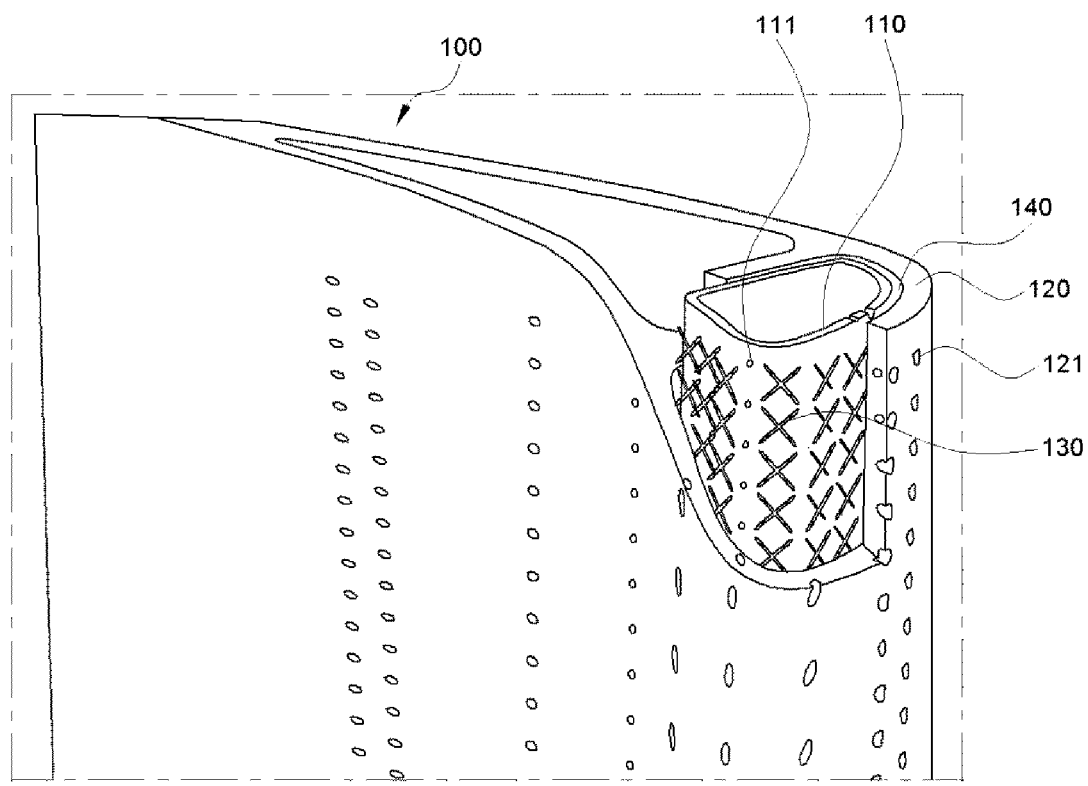
FIG. 5 is a view showing a part of the inside of a gas turbine vane and blade assembly in a lattice-structure cooling type according to another embodiment of the present invention.
Figure 7A:
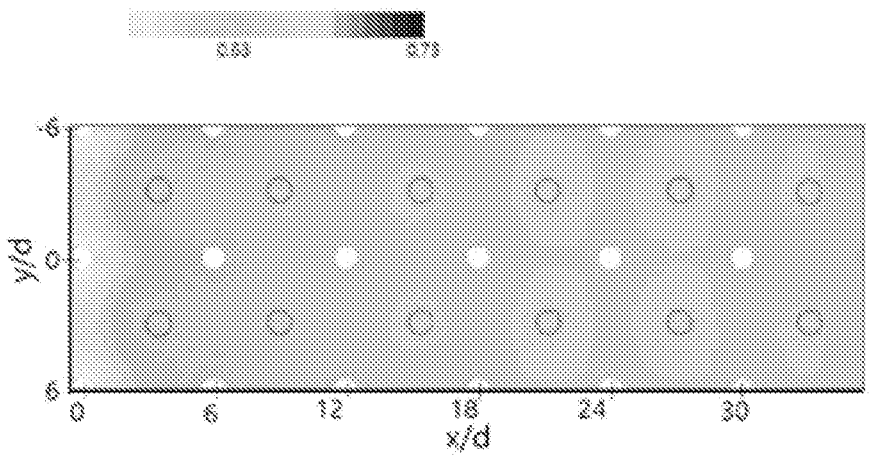
FIGS. 7A to 7C are views showing the cooling efficiency of the gas turbine vane and blade assemblies in the lattice-structure cooling type according to embodiments of the present invention.
Figure 7B:
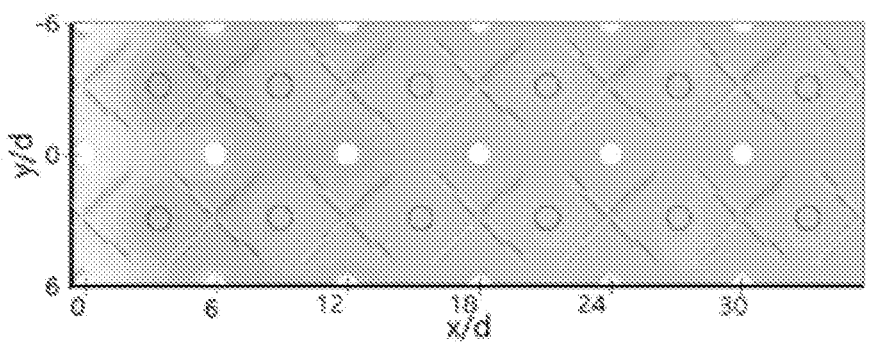
Figure 7C:
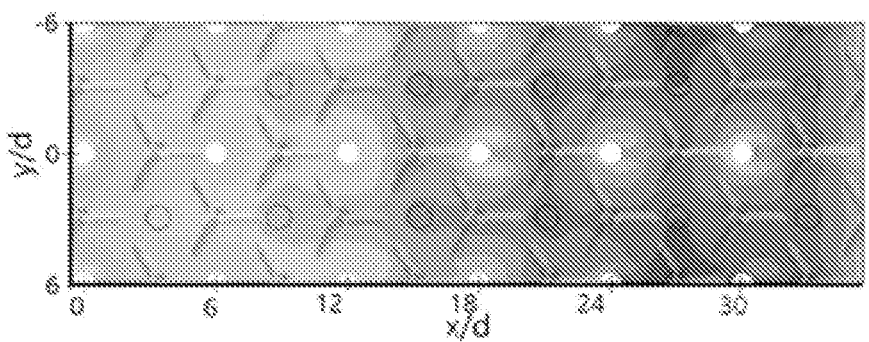
Figure 8:
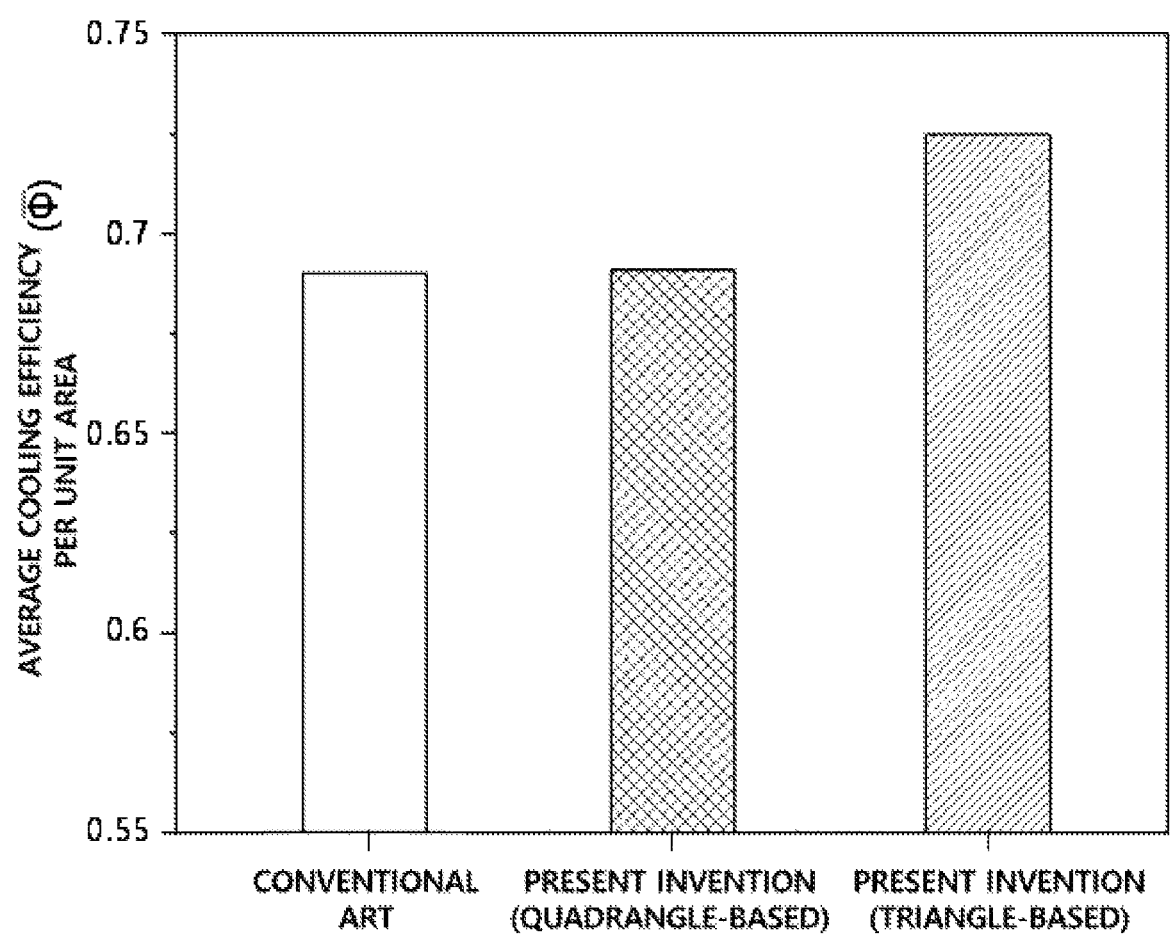
FIG. 8 is a graph in which the gas turbine vane and blade assemblies in the lattice-structure cooling type according to embodiments of the present invention are compared with that in the conventional art in terms of average cooling efficiency per unit area.

FIG. 1 is a view showing a gas turbine vane and blade assembly using a lattice-structure cooling technique according to embodiments of the present invention. FIG. 2 is a view showing a part of the inside of a gas turbine vane and blade assembly in a lattice-structure cooling type according to an embodiment of the present invention. FIGS. 3A and 3B are cross-sectional views showing flows of cooling air in the respective gas turbine vane and blade assemblies in the lattice-structure cooling type according to embodiments of the present invention. FIGS. 4A and 4B are views showing lattice structures in the gas turbine vane and blade assembly in the lattice-structure cooling type according to an embodiment of the present invention. FIG. 5 is a view showing a part of the inside of a gas turbine vane and blade assembly in a lattice-structure cooling type according to another embodiment of the present invention. FIGS. 6A and 6B are views showing lattice structures in the gas turbine vane and blade assembly in the lattice-structure cooling type according to another embodiment of the present invention. FIGS. 7A to 7C are views showing the cooling efficiency of the gas turbine vane and blade assemblies in the lattice-structure cooling type according to embodiments of the present invention. FIG. 8 is a graph in which the gas turbine vane and blade assemblies in the lattice-structure cooling type according to embodiments of the present invention are compared with that in the conventional art in terms of average cooling efficiency per unit area.

A gas turbine vane and blade assembly in a lattice-structure cooling type according to an embodiment of the present invention is a vane and blade assembly 100 applied to a gas turbine. The vane and blade assembly 100 includes a impingement plate 110 disposed on an inner side and having a plurality of injection holes 111, and a effusion plate 120 disposed on an outer side and having a plurality of effusion holes 121, the impingement plate 110 and the effusion plate 120 forming a double partition wall having a cavity therein. A plurality of lattice structures 130 are formed in the cavity 140 to have a flow structure while supporting the impingement plate 110 and the effusion plate 120.

Referring to FIGS. 1 and 2, since the gas turbine vane and blade assembly 100 operates at a very high temperature, cooling technology is inevitably required. For the vane and blade assembly 100, which is exposed to a very high temperature, a impingement/effusion cooling technique having high cooling efficiency is applied by combining the advantages of internal cooling and external cooling.

To this end, in the vane and blade assembly 100, a impingement plate 110 forming an inner side and a effusion plate 120 forming an outer side form a double partition wall. A cavity 140 is formed inside the double partition wall. A plurality of injection holes 111 are formed in the impingement plate 110, and a plurality of effusion holes 121 are formed in the effusion plate 120 to induce a flow of cooling air for cooling.

The impingement plate 110 having the injection holes 111 and the effusion plate 120 having the effusion holes 121 are formed to face each other in parallel. The lattice structures 130 are configured to contact the impingement plate 110 and the effusion plate 120 between the impingement plate 110 and the effusion plate 120.

The impingement plate 110 and the effusion plate 120 form a cavity 140 that is a predetermined space therein. By installing the lattice structures 130 in the cavity 140, the lattice structures 130 form a flow structure for cooling while supporting the impingement plate 110 and the effusion plate 120.

Referring further to FIGS. 3A and 3B, cooling air introduced through the injection holes 111 of the impingement plate 110 flows in such a manner that the cooling air impinges with the effusion plate 120, which is an opposite plate, to cool the gas turbine vane and blade assembly, and further impinges with the lattice structures 130 installed in the cavity 140 to further cool the gas turbine vane and blade assembly, and then the cooling air externally forms a cooling film for cooling the gas turbine vane and blade assembly while being effused through the effusion holes 121 of the effusion plate 120.

Referring to FIG. 4A, the injection holes 111 of the impingement plate 110 and the effusion holes 121 of the effusion plate 120 are arranged in a staggered manner not to face each other.

The injection holes 111 of the impingement plate 110 and the effusion holes 121 of the effusion plate 120 are arranged in a staggered manner with respect to each other. The injection holes 111 of the impingement plate 110 and the effusion holes 121 of the effusion plate 120 are formed at positions that do not overlap each other in the impingement plate 110 and the effusion plate 120, respectively, so that cooling air introduced through the injection holes 111 flows to collide with the effusion plate 120. Thus, the cooling air flows to be effused through the effusion holes 121 after impinges with the effusion plate 120.

The lattice structures 130 are formed between the injection holes 111 and the effusion holes 121 adjacent to each other.

The lattice structures 130 are positioned in the cavity 140 formed between the impingement plate 110 and the effusion plate 120. The lattice structures 130 are positioned with a uniform arrangement in a longitudinal or transverse direction between the injection holes 111 and the effusion holes 121 adjacent to each other.

When the impingement plate 110 and the effusion plate 120 disposed in parallel to each other are viewed in a plan view, the injection holes 111 and the effusion holes 121 are positioned in a staggered manner not to overlap each other while having a uniform arrangement. In addition, a predetermined space is formed between the injection holes 111 and the effusion holes 121. That is, the lattice structures 130 are positioned between the injection holes 111 and the effusion holes 121 arranged adjacent to each other not to overlap each other.

Referring to FIG. 4B, each of the lattice structures 130 may be formed in a triangular pyramid structure.

The lattice structures 130 make it possible to effectively support the impingement plate 110 and the effusion plate 120 in the form of the double partition wall with the cavity 140 inside.

In addition, since the lattice structure 130 has a triangular pyramid shape in the lattice form, the flow of the cooling air introduced through the injection holes 111 may be changed after the cooling air impinges with the effusion plate 120.

The lattice structure 130 may have a lattice shape in the form of a triangular pyramid having three supports 131 with an empty space inside. The cooling air hits the supports 131 or passes through the inside of the lattice structure 130, which may cause a flow different from that in the conventional art.

In the cavity 140 between the impingement plate 110 and the effusion plate 120, the lattice structure 130 may be installed in such a manner that the three supports 131 are attached to the impingement plate 110, and a vertex at which the supports 131 meet is attached to the effusion plate 120. Since the space between the supports 131 is empty, the empty space causes turbulence of cooling air and increases heat transfer when the cooling air flows therethrough.

Referring to FIG. 3A together, it can be seen how cooling air flows in a state where the lattice structures 130 are installed. The cooling air is introduced through the injection holes 111 of the impingement plate 110, and then dispersed by impinges with the effusion plate 120. In addition, the flow of the cooling air is changed once more by the lattice structures 130, thereby enhancing the cooling effect.

FIGS. 5 and 6 illustrate a gas turbine vane and blade assembly in a lattice-structure cooling system according to another embodiment of the present invention, which is different in the shape of the lattice structure 130 from the gas turbine vane and blade assembly in the lattice-structure cooling system according to an embodiment of the present invention.

Referring to FIG. 6A, the lattice structures 130 are formed in the cavity 140 formed between the impingement plate 110 and the effusion plate 120. The lattice structures 130 are positioned with a uniform arrangement in a longitudinal or transverse direction between the injection holes 111 and the effusion holes 121 adjacent to each other.

When the impingement plate 110 and the effusion plate 120 disposed in parallel to each other are viewed in a plan view, the injection holes 111 and the effusion holes 121 are positioned in a staggered manner not to overlap each other while having a uniform arrangement. In addition, a predetermined space is formed between the injection holes 111 and the effusion holes 121. That is, the lattice structures 130 are positioned between the injection holes 111 and the effusion holes 121 arranged adjacent to each other not to overlap each other.

Referring to FIG. 6B, each of the lattice structures 130 may be formed in a quadrangular pyramid structure.

The lattice structures 130 make it possible to effectively support the impingement plate 110 and the effusion plate 120 in the form of the double partition wall with the cavity 140 inside.

In addition, since the lattice structure 130 has a quadrangular pyramid shape in the lattice form, the flow of the cooling air introduced through the injection holes 111 may be changed after the cooling air impinges with the effusion plate 120.

The lattice structure 130 may have a lattice shape in the form of a quadrangular pyramid having four supports 131 with an empty space inside. The cooling air hits the supports 131 or passes through the inside of the lattice structure 130, which may cause a flow different from that in the conventional art.

In the cavity 140 between the impingement plate 110 and the effusion plate 120, the lattice structure 130 may be installed in such a manner that the four supports 131 are attached to the impingement plate 110, and a vertex at which the supports 131 meet is attached to the effusion plate 120. Since the space between the supports 131 is empty, the empty space causes turbulence of cooling air and increases heat transfer when the cooling air flows therethrough.

Referring to FIG. 3A together, it can be seen how cooling air flows in a state where the lattice structures 130 are installed. The cooling air is introduced through the injection holes 111 of the impingement plate 110, and then dispersed by impinges with the effusion plate 120. In addition, the flow of the cooling air is changed once more by the lattice structures 130, thereby enhancing the cooling effect.

Referring back to FIG. 6B, each of the lattice structures 130 in the quadrangular pyramid form may be constituted by two quadrangular pyramids. In this case, the lattice structure 130 may be formed of a total of eight supports 131 in such a manner that the eight supports 131 meet at a vertex formed at the center between the impingement plate 110 to which four supports 131 are attached and the effusion plate 120 to which the other four supports 131 are attached. That is, the lattice structure 130 may be formed in such a manner that the two quadrangular pyramids are held by each other by attaching the vertices thereof to each other.

Referring to FIG. 3B together, it can be seen how cooling air flows in a state where the lattice structures 130 are installed. The cooling air is introduced through the injection holes 111 of the impingement plate 110, and then dispersed by impinges with the effusion plate 120. In addition, the flow of the cooling air is changed once more by the lattice structures 130, thereby enhancing the cooling effect.

The quadrangular-pyramid lattice structures 130 may create a flow of cooling air in a different pattern from the triangular-pyramid lattice structures 130 of the gas turbine vane and blade assembly in the lattice-structure cooling type according to an embodiment of the present invention.

Since cooling air flows in a different pattern depending on the shape of the lattice structures 130 as described above, the shape of the lattice structures 130 may be changed to obtain a desired cooling effect.

In addition, the lattice structures 130 may replace supports that are used during an additive manufacturing process. The lattice structures 130 in the gas turbine vane and blade assemblies in the lattice-structure cooling type according to the embodiments of the present invention use an additive manufacturing technique. In this case, supports are needed between the impingement plate 110 and the effusion plate 120 to support the impingement plate 110 and the effusion plate 120. The use of such supports is very inefficient because the supports need to be removed after the additive manufacturing process is completed.

However, by using the lattice structures 130 that function as supports by themselves, it is possible to enhance the efficiency of the additive manufacturing process.

Referring to FIGS. 7B and 7C, cooling efficiency can be seen from outer surfaces of the effusion plates 120 in the gas turbine vane and blade assemblies in the lattice-structure cooling type according to the embodiments of the present invention (the darker the color, the lower the temperature).

FIG. 7A shows a cooling effect in the conventional impingement/effusion cooling technique with no lattice structures 130. FIG. 7B shows a cooling effect when the quadrangular-pyramid lattice structures 130 are applied, and FIG. 7C shows a cooling effect when the triangular-pyramid lattice structures 130 are applied.

Referring to FIG. 7A, a cooling effect locally appears mainly at impingement places where the injection holes 111 of the impingement plate 110 are positioned, and cooling efficiency increases around some of the effusion holes 121 due to film cooling. In addition, it is observed that heat transfer decreases due to interference effects of adjacent jets.

In contrast, referring to FIGS. 7B and 7C, it can be seen that different cooling effects appear when the quadrangular-pyramid lattice structures 130 and the triangular-pyramid lattice structures 130 are applied, respectively. It has been confirmed that while the quadrangular-pyramid lattice structures 130 cause cooling efficiency slightly higher than that in the conventional art, the triangular-pyramid lattice structures 130 cause cooling efficiency much higher than that in the conventional art.

In addition, referring to FIG. 8, it can be seen that, when the lattice structures 130 are installed, average cooling efficiency per unit area increases. (The word "quadrangle-based" indicates quadrangular-pyramid lattice structures, and the word "triangle-based" indicates triangular-pyramid lattice structures.)

In addition, by manufacturing the gas turbine vane and blade assembly using an additive manufacturing technique, it is possible to improve not only efficiency but also structural rigidity.

A method of manufacturing a gas turbine vane and blade assembly in a lattice-structure cooling type according to an embodiment of the present invention includes: selecting a shape of the lattice structures 130; and performing an additive manufacturing process using a metal 3D printer to manufacture the gas turbine vane and blade assembly in a double partition wall structure with the lattice structures 130 inside.

In the performing of the additive manufacturing process, a build orientation in which the lattice structures 130 are stacked is selectable.

The gas turbine vane and blade assembly in the lattice-structure cooling type according to an embodiment of the present invention is manufactured in an additive manufacturing process using a metal 3D printer.

The gas turbine vane and blade assembly 100 according to the present invention has a double partition wall structure including a impingement plate 110 and a effusion plate 120 with a cavity 140 formed inside. In addition, lattice structures 130 are formed in the cavity 140 to induce an internal flow while supporting the impingement plate 110 and the effusion plate 120.

In this case, the additive manufacturing process, which is a layered manufacturing process, has directionality. Therefore, in order to manufacture lattice structures having an inclined structure in a desired shape, certain restrictions are imposed.

Due to the directionality in the additive manufacturing process, when lattice structures exceeding a certain angle (generally about 45 degrees with respect to a build surface) are manufactured, the lattice structures collapse.

In order to prevent the collapse of the lattice structures, it has been necessary to erect supports capable of supporting the lattice structures on the lattice structures.

However, such a method has problems in that a different design is required whenever the shape of the lattice structures is changed, and the supports need to be subject to post-treatment such as cutting and polishing processes. In addition, such a method has a problem in that when the supports are disposed in the vane and blade assembly, it is difficult, or sometimes impossible, to remove the supports.

In contrast, when a shape of lattice structures 130 is selected and the selected shape of the lattice structures 130 is applied to an additive manufacturing process according to the method of manufacturing the gas turbine vane and blade assembly in the lattice-structure cooling type according to an embodiment of the present invention, the lattice structures 130 function as supports, thereby not requiring any separate supports for supporting the impingement plate 110 and the effusion plate 120 therebetween, and the lattice structures 130 also form a flow structure for cooling.

The embodiments of the present invention described above are merely exemplary, and those skilled in the art will appreciate that various modifications and other equivalent embodiments may be made. Thus, it will be well understood by those skilled in the art that the present invention is not limited to the above-described embodiments. Therefore, the true technical protection scope of the present invention should be defined by the technical spirit of the appended claims. In addition, it should be noted that the present invention is intended to cover all modifications, equivalents and substitutions falling within the spirit and scope of the present invention as defined by the appended claims.

What is claimed is:

1. A gas turbine vane and blade assembly in a lattice-structure cooling type, which is a vane and blade assembly applied to a gas turbine, the gas turbine vane and blade assembly comprising:
    an impingement plate disposed on an inner side and having a plurality of injection holes arranged in a linear pattern;
    an effusion plate disposed on an outer side and having a plurality of effusion holes arranged in a linear pattern that is offset from the plurality of injections holes, the impingement plate and the effusion plate forming a double partition wall having a cavity therein; and
    a plurality of lattice structures positioned in the cavity to have a flow structure while supporting the impingement plate and the effusion plate, wherein the plurality of lattice structures are positioned between the plurality of injection holes and the plurality of effusion holes.

2. The gas turbine vane and blade assembly of claim 1, wherein the injection holes of the impingement plate and the effusion holes of the effusion plate are arranged in a staggered manner not to face each other.

3. The gas turbine vane and blade assembly of claim 1, wherein each of the lattice structures has a triangular pyramid structure in an additive manufacturing process.

4. The gas turbine vane and blade assembly of claim 1, wherein each of the lattice structures has a quadrangular pyramid structure in an additive manufacturing process.

5. A method of manufacturing the gas turbine vane and blade assembly of claim 1, the method comprising:
    selecting a shape of the lattice structures; and
    performing an additive manufacturing process using a metal 3D printer to manufacture the gas turbine vane and blade assembly in a double partition wall structure with the lattice structures inside.

6. The method of claim 5, wherein in the performing of the additive manufacturing process, a build orientation in which the lattice structures are stacked is selectable.

* * * * *